US011476780B2

(12) United States Patent
Yang et al.

(10) Patent No.: US 11,476,780 B2
(45) Date of Patent: Oct. 18, 2022

(54) ENERGY HARVESTER AND A WEARABLE DEVICE

(71) Applicant: City University of Hong Kong, Kowloon (HK)

(72) Inventors: Zhengbao Yang, Kowloon (HK); Biao Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 400 days.

(21) Appl. No.: 16/830,449

(22) Filed: Mar. 26, 2020

(65) Prior Publication Data

US 2021/0305914 A1  Sep. 30, 2021

(51) Int. Cl.
| | |
|---|---|
| *H02N 2/18* | (2006.01) |
| *H02J 7/32* | (2006.01) |
| *G04C 10/00* | (2006.01) |
| *A44C 5/00* | (2006.01) |

(52) U.S. Cl.
CPC ............ *H02N 2/186* (2013.01); *A44C 5/0007* (2013.01); *G04C 10/00* (2013.01); *H02J 7/32* (2013.01); *H02N 2/181* (2013.01); *H02N 2/183* (2013.01)

(58) Field of Classification Search
CPC ........ H02N 2/186; H02N 2/181; H02N 2/183; H02N 2/18; H02J 7/32; A44C 5/0007; G04C 10/00; G04G 19/00
See application file for complete search history.

(56) References Cited

U.S. PATENT DOCUMENTS

| | | | | |
|---|---|---|---|---|
| 4,106,279 | A | * | 8/1978 | Martin .................... H01L 35/00 368/203 |
| 4,213,292 | A | | 7/1980 | Dolezal et al. |
| 6,858,970 | B2 | | 2/2005 | Malkin et al. |
| 6,911,764 | B2 | * | 6/2005 | Pelrine ................... H04R 19/02 310/330 |
| 7,471,033 | B2 | | 12/2008 | Thiesen et al. |
| 8,134,282 | B1 | | 3/2012 | Churchill et al. |
| 8,354,778 | B2 | | 1/2013 | Arnold et al. |

(Continued)

FOREIGN PATENT DOCUMENTS

WO      2019089466      5/2019

OTHER PUBLICATIONS

Wang, Yancheng, et al. "Wearable thermoelectric generator to harvest body heat for powering a miniaturized accelerometer." Applied energy 215 (2018): 690-698.

(Continued)

*Primary Examiner* — Pedro J Cuevas
(74) *Attorney, Agent, or Firm* — Renner Kenner Greive Bobak Taylor & Weber (57) ABSTRACT

An energy harvester (100) includes: an inner band (110); an outer band (120) arranged to surround the inner band (110), wherein the inner band (110) is coupled to the outer band (120) at a fixed end (20) and the inner band (110) is spaced from the outer band (120) at a free end (30); and an energy generator (150) arranged to generate electric energy through relative movement between the inner band (110) and the outer band (120) at the free end (30). Also disclosed is a wearable device (10) including: a wearable strap formed by the inner band (110) and the outer band (120) of the energy harvester (100), and a mass (130) arranged to receive at least a portion of the wearable device (10).

24 Claims, 11 Drawing Sheets

(56) References Cited

U.S. PATENT DOCUMENTS

| | | | |
|---|---|---|---|
| 8,487,456 | B2 | 7/2013 | Donelan et al. |
| 8,680,752 | B2 | 3/2014 | Ayazi et al. |
| 9,121,394 | B2 | 9/2015 | Bachmann et al. |
| 9,331,559 | B2 | 5/2016 | Shastry et al. |
| 9,484,522 | B2 | 11/2016 | Andosca et al. |
| 9,711,705 | B2 | 7/2017 | Lang |
| 9,788,641 | B2 * | 10/2017 | Davis .................. A41D 1/002 |
| 9,837,933 | B2 | 12/2017 | Park et al. |
| 10,103,648 | B2 | 10/2018 | Park et al. |
| 2008/0164702 | A1 | 7/2008 | Brown et al. |
| 2009/0069045 | A1 | 3/2009 | Cheng |
| 2015/0061464 | A1 * | 3/2015 | Park ..................... H02N 1/04 310/329 |
| 2017/0063198 | A1 * | 3/2017 | Spencer ................. H02J 7/345 |
| 2017/0133953 | A1 | 5/2017 | Gross et al. |
| 2020/0316366 | A1 * | 10/2020 | Wang .................. A61F 13/0273 |
| 2021/0109480 | A1 * | 4/2021 | Wang .................... G04C 1/082 |
| 2022/0026853 | A1 * | 1/2022 | Takahashi ............. G01D 11/24 |

OTHER PUBLICATIONS

Yeo, Hong Goo, et al. "Strongly (001) Oriented Bimorph PZT Film on Metal Foils Grown by rf—Sputtering for Wrist—Worn Piezoelectric Energy Harvesters." Advanced Functional Materials 28.36 (2018): 1801327.

M. Thielen et al., "Human body heat for powering wearable devices: From thermal energy to application." Energy conversion and management 131 (2017): 44-54.

T. Quan etal, "Hybridized electromagnetic-triboelectric nanogenerator for a self-powered electronic watch", ACS nano 9.12 (2015): 12301-12310.

Y. Bai et al., "Investigation of a cantilever structured piezoelectric energy harvester used for wearable devices with random vibration input" Mechanical Systems and Signal Processing 106 (2018): 303-318.

M. Wahbah et al, "Characterization of human body-based thermal and vibration energy harvesting for wearable devices." IEEE Journal on emerging and selected topics in circuits and systems 4.3 (2014): 354-363.

W. Jung et al. "Powerful curved piezoelectric generator for wearable applications." Nano Energy 13 (2015): 174-181.

* cited by examiner

ENERGY HARVESTER AND A WEARABLE DEVICE

TECHNICAL FIELD

The present disclosure relates to an energy harvester, in particular but not limited to, an energy harvester wrapped and secured to a human's limb. The present disclosure also relates to an electrical device, in particular but not limited to a wearable device, incorporating the energy harvester for energy supply to the device.

BACKGROUND

Wearable devices such as smartwatches and activity trackers are changing our lifestyle towards a more convenient and healthier way. The huge market potential of wearable devices is widely recognised.

Along with the widespread market adoption of wearable devices, problems of the power source battery become increasingly distinct. Batteries have limited lifespans and require frequent recharging. The end-of-life battery disposal also poses severe environmental problems.

SUMMARY OF THE INVENTION

In accordance with a first aspect of the present invention, there is provided an energy harvester comprising: an inner band; an outer band arranged to surround the inner band, wherein the inner band is coupled to the outer band at a fixed end and the inner band is spaced from the outer band at a free end; and an energy generator arranged to generate electric energy through relative movement between the inner band and the outer band at the free end.

In an embodiment of the first aspect, the energy generator is positioned on the surface of the outer band.

In an embodiment of the first aspect, the energy generator is positioned along the length of the outer band between the fixed end and the free end.

In an embodiment of the first aspect, the outer band is elliptic whereby the inner band and the outer band intersecting with each other at the fixed end and separating from each other at the free end.

In an embodiment of the first aspect, the energy generator is positioned at a vertex of the ellipse of the outer band.

In an embodiment of the first aspect, the outer band is formed by a composite layer.

In an embodiment of the first aspect, the composite layer includes an elastic substrate layer and a piezoelectric layer attached thereto, whereby the piezoelectric layer is arranged to generate electric energy in response to deformation of the substrate layer.

In an embodiment of the first aspect, the elastic substrate layer is sandwiched between two said piezoelectric layers.

In an embodiment of the first aspect, the piezoelectric layer is further covered by a protection layer.

In an embodiment of the first aspect, the outer band is of uniform thickness or width across its length along which one or more energy generators are disposed thereon.

In an embodiment of the first aspect, the outer band is of variable thickness or width across its length to form one or more spots at which the stress is concentrated and on which the energy generator is disposed, thereby facilitating the generation of electric energy by the energy generator.

In an embodiment of the first aspect, the energy harvester further includes one or more linkage extending across the inner band and the outer band and the linkage includes said energy generator.

In an embodiment of the first aspect, the energy harvester further includes an elastic membrane arranged to wrap the inner band and the outer band together to form a composite band.

In an embodiment of the first aspect, the elastic membrane is at least one of waterproof and dustproof.

In an embodiment of the first aspect, the wrapped inner band and outer band are invisible through the elastic membrane.

In an embodiment of the first aspect, the inner band is formed by a first material and the outer band is formed by a second material with a higher stiffness than the first material.

In an embodiment of the first aspect, the energy harvester further includes a mass at a position proximate to the free end to facilitate the movement of the outer band through its vertical movement, thereby increasing the magnitude of generated electric energy by the outer band.

In an embodiment of the first aspect, the energy harvester further includes an electronic device arranged to receive electric energy from the energy generator.

In an embodiment of the first aspect, the electronic device is received by the mass.

In an embodiment of the first aspect, the energy harvester includes at least two said energy generators and the two energy generators are in at least one of serial connection and parallel connection.

In an embodiment of the first aspect, the energy harvester further includes a rectifier arranged to receive generated electric energy from the energy generator and to convert received electric energy in alternating current to direct current.

In an embodiment of the first aspect, the inner band includes a first arm and a second arm connectable together to form a closed loop and releasable from each other to form an open loop.

In an embodiment of the first aspect, the inner band is arranged to secure to a human limb for generating electric energy in response to the movement of the outer band activated by the movement of human limb.

In accordance with a second aspect of the present invention, there is provided a wearable device comprising: a wearable strap formed by the inner band and the outer band of the energy harvester of the present invention, and a mass arranged to receive at least a portion of the wearable device.

BRIEF DESCRIPTION OF THE DRAWINGS

These and/or other exemplary aspects and advantages will become apparent and more readily appreciated from the following description and the accompanying drawings.

DETAILED DESCRIPTION

To tackle the battery problems, energy harvesters are used to harness energy from human daily activities and convert the wasted energy to electricity, i.e. convert human power into electrical power. Mechanical energy and thermal energy are the two major resources for this purpose. The temperature difference between human body and the surroundings is used by the thermoelectric generators to generate power. For wrist-worn mechanical energy harvesting, the major energy conversion methods include the electromagnetic effect, the triboelectric effect and the piezoelectric effect.

Without wishing to be bound by theories, the inventors, through their own researches, trials and experiments, have devised that several commonly used piezoelectric energy harvester for wearable devices requires significant structural changes to the wearable devices, yet the power output is low at microwatt level, which is not enough for continuously powering most targeted wearable devices. Inevitably, either the battery size is increased or the power consumption of wearable devices is reduced in order to compromise such battery limitation.

Referring to FIGS. 1 to 11, there is provided an energy harvester 100 comprising: an inner band 110; an outer band 120 arranged to surround the inner band 110, wherein the inner band 110 is coupled to the outer band 120 at a fixed end 20 and the inner band 110 is spaced from the outer band 120 at a free end 30; and an energy generator 150 arranged to generate electric energy through relative movement between the inner band 110 and the outer band 120 at the free end 30.

Hereinafter, exemplary embodiments will be described in detail with reference to the accompanying drawings. The sizes or thickness of exemplary embodiments are exaggerated for purposes of clear illustration.

Figure 1:
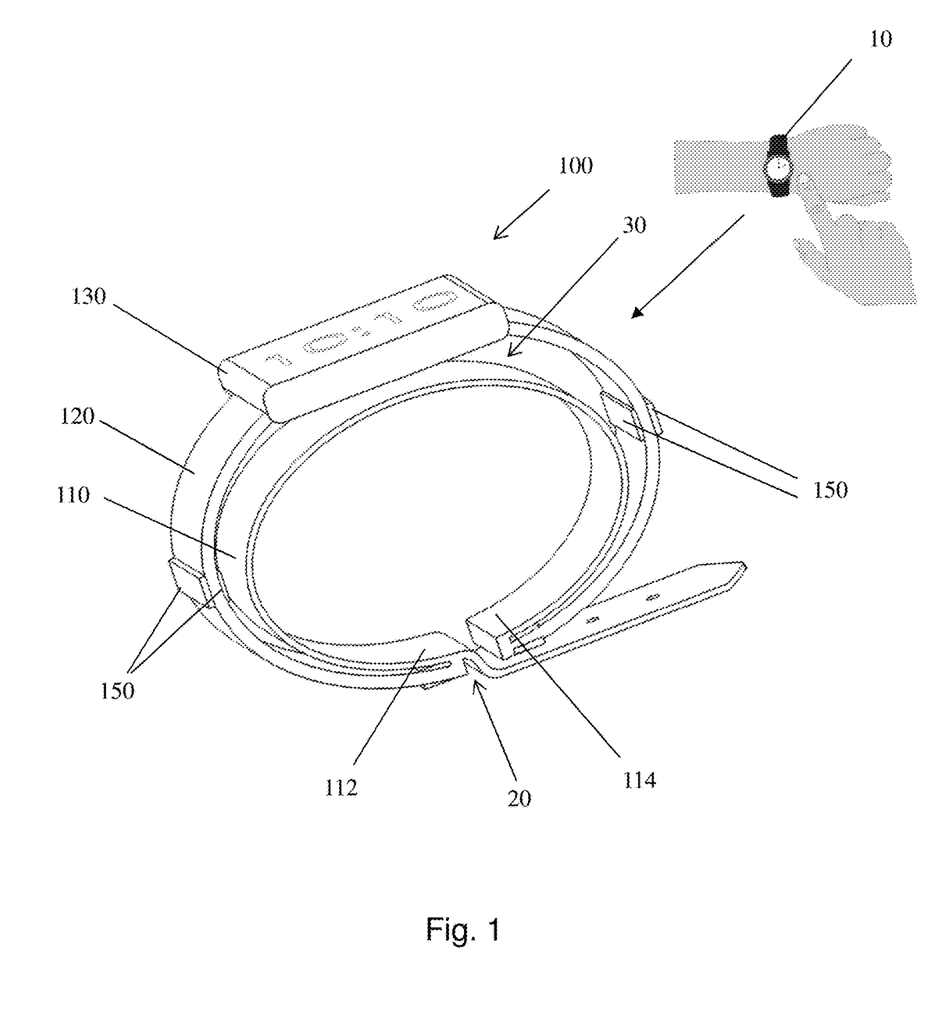
FIG. 1 is an isometric view of a self-powered wrist wearable incorporating the energy harvester 100 in accordance with a first exemplary embodiment of the present invention.
Figure 2:
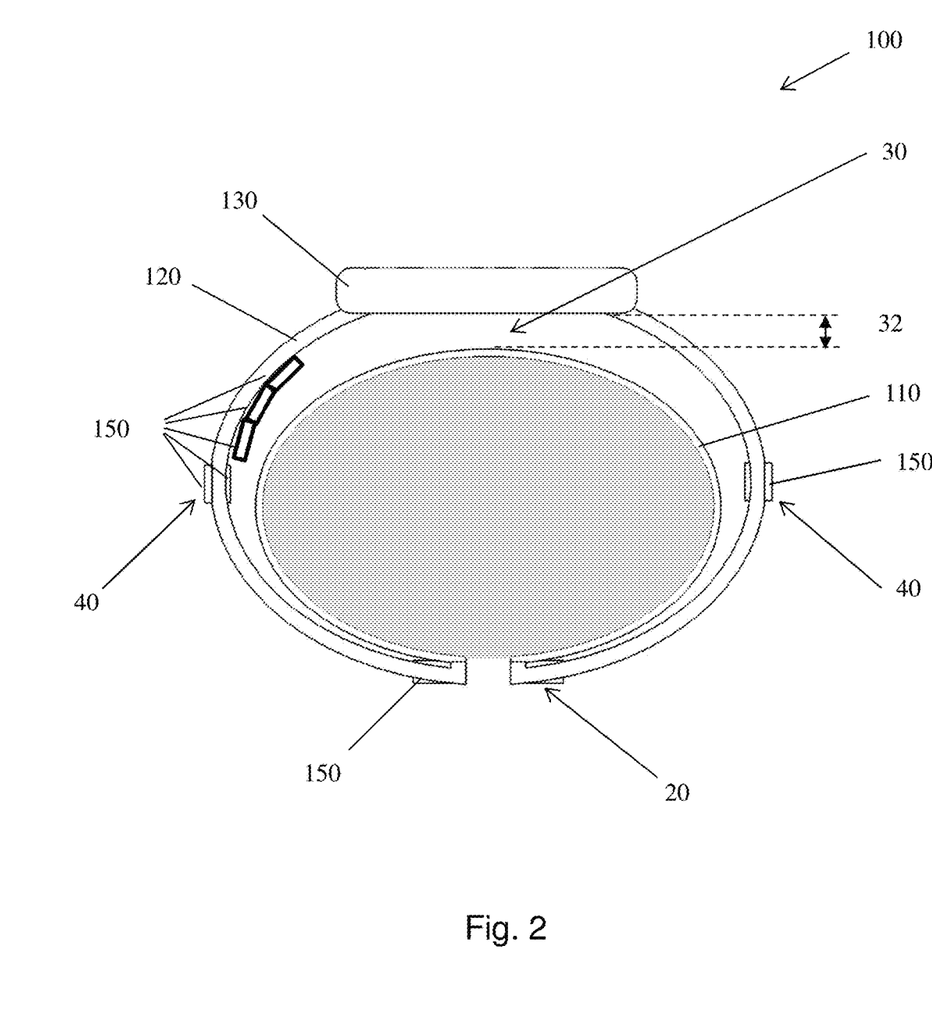
FIG. 2 is the front view of the first exemplary embodiment of the present invention as depicted in FIG. 1.

Referring now to FIGS. 1 to 2 for a first exemplary embodiment of the present invention. FIG. 1 is an isometric view of the self-powered wrist wearable device 10 such as a fitness tracker or a smart watch that incorporates an energy harvester 100, illustrating the major components and the installation sites. For simplicity, FIG. 1 does not show auxiliary components such as the protection layer that wrapping around the bands, the strap clasp structure and wire connections.

The wearable device 10 is primarily made of a case body 130, a wearable strap carrying the case body 130, and the energy harvester 100 for powering the wearable device 10. The wearable device 10 is worn on the wrist through the wearable strap, similar to watches and bands.

The energy harvester 100 has a unique two-layer band design. In this arrangement, it comprises an inner band 110 for fixing the whole device 100 on the wrist, an outer band 120 for supporting the case of the watch body 130, and one or more energy generators 150 preferably formed by piezoelectric elements for converting mechanical energy to electrical energy.

The inner band 110 is to fix the whole device on the wrist and at the same time does not cause any uncomfortable burden to the wearer. It is preferably a flexible strap, made of commonly watch strap materials such as leather, nylon, cloth, rubber, metal chain and/or in combination.

The inner band 110 includes a first arm 112 and a second arm 114 connectable together to form a closed loop to secure to a human limb and releasable from each other to form an open loop. The inner band 110 shares a similar structure and connection method of commonly seen watches. For instance, the inner band 110 closes with a buckle or a folding clasp or a pin-hole structure.

The outer band 120 is a curved composite beam. It is an elliptic and elastic thin beam around the wrist over the inner band 120. The outer band 120 is fixed with the inner band 110 via adhesives or other connection methods near the buckle end. The outer band 120 is made of steel or plastics. It is relatively stiffer than the inner band 110.

Piezoelectric elements 150 are attached on the surface of the outer band 120 to capture strain energy from the motion of the watch body 130. The stiff outer band 120 can efficiently transmit force to the piezoelectric patches 150 attached. The outer band 120 can move relatively to the wrist in the plane perpendicular to the lower arm.

The case body 130 is fixed on the top of the outer band 120. The connection condition can be pinned or fixed. The case 130 contains functional units for a wearable such as screen, sensors, MCUs, wireless communication and power management circuits, etc. The case 130 can contain a watch body or other functional units.

FIG. 2 is the front view of the self-powered wrist wearable embodiment. For simplicity, the strap buckle unit are not drawn hereafter.

From this perspective, there is clearly shown a gap 32 between the inner band 110 and the outer band 120. The gap 32, on one hand, allows the outer band 120 to move relatively to the inner band 110 that is fixed on the wrist, and on the other band, limits the movement range of the outer band 120 to protect the wearable device 10 from large deformation, overload and fatigue. The inner band 110 and the outer band 120 show the elliptic geometry.

Preferably, the piezoelectric elements 150 can be attached to the outer band 120 on multiple positions. In this exemplary embodiment, pairs of piezoelectric elements 150 are attached to the outer band 120 at the fixed end 20 and about the two elliptic vertex points 40. Optionally, more piezoelectric elements 150 can be added to generate more power.

The piezoelectric elements 150 can be electrically connected directly in parallel or in series. In the parallel connection, the output current will be increased; in the series connection, the output voltage will be increased. The piezoelectric elements 150 can also be electrically isolated from each other for preventing potential electric charge cancellation when the stress states of each piezoelectric element differ a lot.

Figure 3:
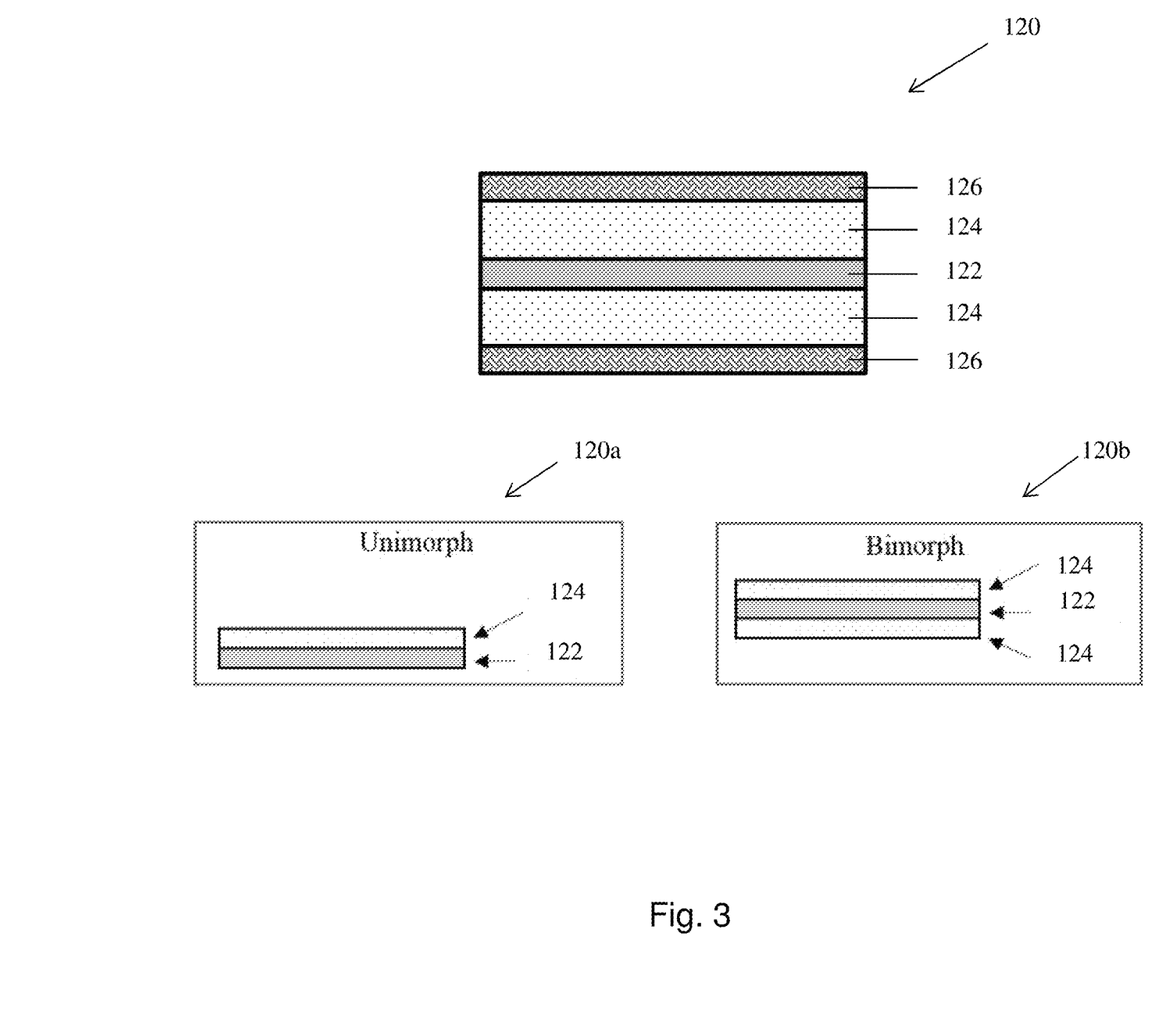
FIG. 3 shows the outer band composite structure and the cross section of the outer band showing the multilayer of the unimorph and bimorph beams.
Figure 4:
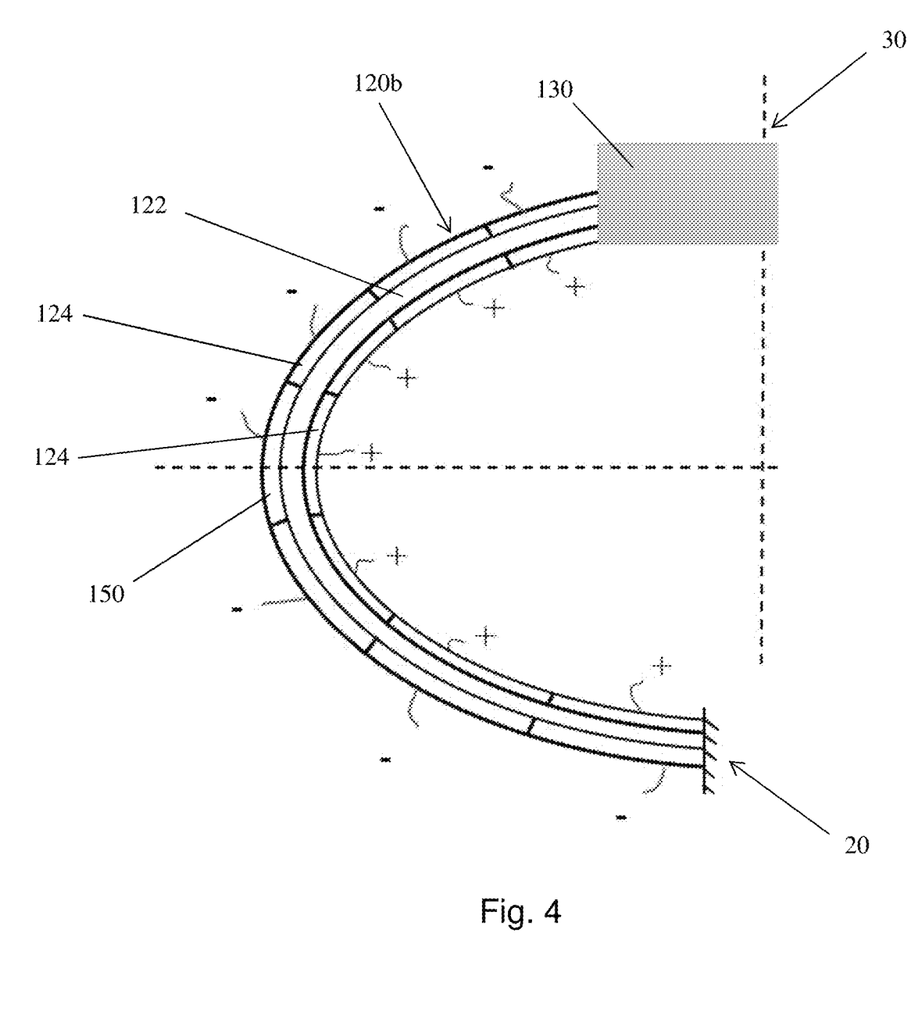
FIG. 4 is the layout of the piezoelectric elements on the outer bands of a second exemplary embodiment of the present invention with a uniform composite beam.

Referring now to FIGS. 3 to 4 for a second exemplary embodiment of the present invention.

FIG. 3 illustrates the cross section of the outer band 120 of the second exemplary embodiment. The outer band 120 is a composite elastic beam i.e. a composite layer. Essentially, it includes an elastic substrate layer 122 and includes a piezoelectric element layer 124 that is adhered to the elastic substrate layer 122. When the elastic substrate layer 122 is subject to deformation, the piezoelectric layer 124 is stressed and thus electric energy is generated by the piezoelectric layer 124.

The substrate layer 122 of the outer band 120 can be fully covered by piezoelectric element layers 124, or partially covered by the piezoelectric element layers 124. Optionally, there may be provided a protection layer 126 for covering the piezoelectric element layer 124.

Geometry and material parameters of the outer band 120 are optimized so that most stress is loaded to the piezoelectric elements 124. For simplicity, electrodes of piezoelectric elements 124 and adhesive layers of the composite are not drawn in the figure.

The outer band 120 can be a unimorph beam 120a that includes only one elastic substrate layer 122 and one piezoelectric element layer 124 and an additional protection layer 126. Alternatively and more preferably, the outer band 120 can also be a bimorph beam 120b that refers to one elastic substrate layer 122 sandwiched by two piezoelectric element layers 124 and further wrapped by two protection layers 126.

The protection layer 126 is designed to protect the piezoelectric elements 124 from the outside environment e.g. water proof and dust proof, and barely affects the stress condition. For instance, an elastic membrane or deformable textile can be introduced to this embodiment as the protection layer 126. It connects the inner and outer band 110, 120 and wraps around the two-band structure. The wrapped inner band 110 and outer band 120 are invisible through the elastic membrane 126. Thus, one cannot see the two-layer design i.e. the elastic substrate layer 122 and the piezoelectric element layer 124 from outside because of the existence of the protection layer 126.

FIG. 4 shows the layout of the piezoelectric elements 150 on the outer bands 120 of another exemplary embodiment with a uniform composite beam incorporating the bimorph structure 120b as depicted in FIG. 3 and described above. The embodiment is a symmetric structure, so only half is drawn here for simplicity.

To analyse the working principle, the end where the outer band 120 is connected with the inner band 110 is simplified as a fixed end 20; the other end of the outer band 120 connected with the case body 130 is considered as a movable end i.e. free end. As shown in FIG. 4, the outer band 120 is composed of an elastic substrate layer 122, a layer of piezoelectric elements 124 on one side of the elastic substrate layer 122, and a layer of piezoelectric elements 124 on the other side of the elastic substrate layer 122.

When the structure deforms, the two piezoelectric layers 124 will experience different stress state, one compressed and the other stretched, so that the voltage responses have opposite sign, one positive and the other negative. Furthermore, the stress distribution along the outer band 120 varies, so does the voltage responses of the attached piezoelectric elements 150 in the piezoelectric layers 124. Thus, the piezoelectric elements 150 are not directly connected with one another. Preferably, the energy harvester 100 includes a power management circuit to treat the electric energy input from each piezoelectric element 150 individually and in turn rectify the multiple AC inputs.

The inventors have also devised that if the outer band 120 is fully covered with piezoelectric elements 150, this will be costly and also pose challenges to the power management circuit. The present invention also relates to a stress-concentrated composite outer band 120, which reduces the amount of piezoelectric elements 150 as well as improving the yielded electrical energy.

Figure 5:
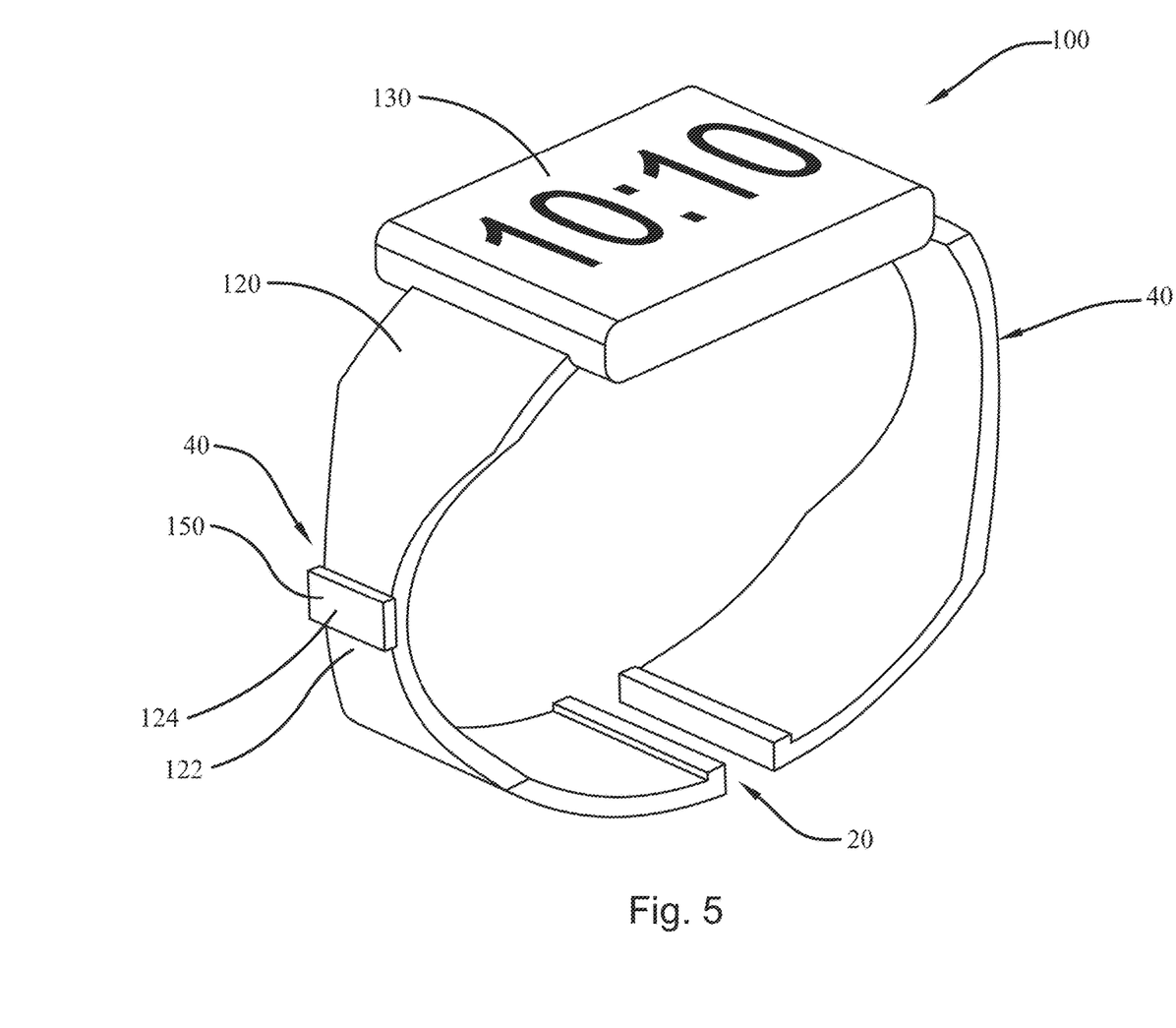
FIG. 5 is the layout of the piezoelectric elements on the outer bands of a third exemplary embodiment of the present invention with a stress-concentration composite beam.

Referring now to FIG. 5 for a third exemplary embodiment of the present invention. FIG. 5 is the layout of the piezoelectric elements 150 on the outer bands 120 of another exemplary embodiment with a stress-concentration composite beam. The inner band 110 is not drawn here for simplicity.

FIG. 5 shows an optimized outer band 120 with a variable width across its length. As illustrated, the simplified exemplary embodiment does not have uniform beam as the outer band 120 in contrast to the previous embodiments as depicted in FIGS. 1 to 4. Around the two vertex points 40, the width is smaller so that stress exists and concentrates around these areas. Piezoelectric elements 150 are only placed on these stress concentration places to harvest energy. In such a way, a less quantity of piezoelectric elements 150 is utilised and thus this simplifies the power management.

Alternatively, the outer band 120 may be fabricated with a variable thickness. Thickness-varying beams can be readily fabricated via the 3D printing technology. In such a way, stress can also be concentrated to the spots 40 where piezoelectric elements 150 are attached.

Optionally, the width-varying method can also be implemented together with the thickness-varying method, thereby facilitating the energy harvesting on the outer band 120 by the piezoelectric elements 150.

Figure 6:
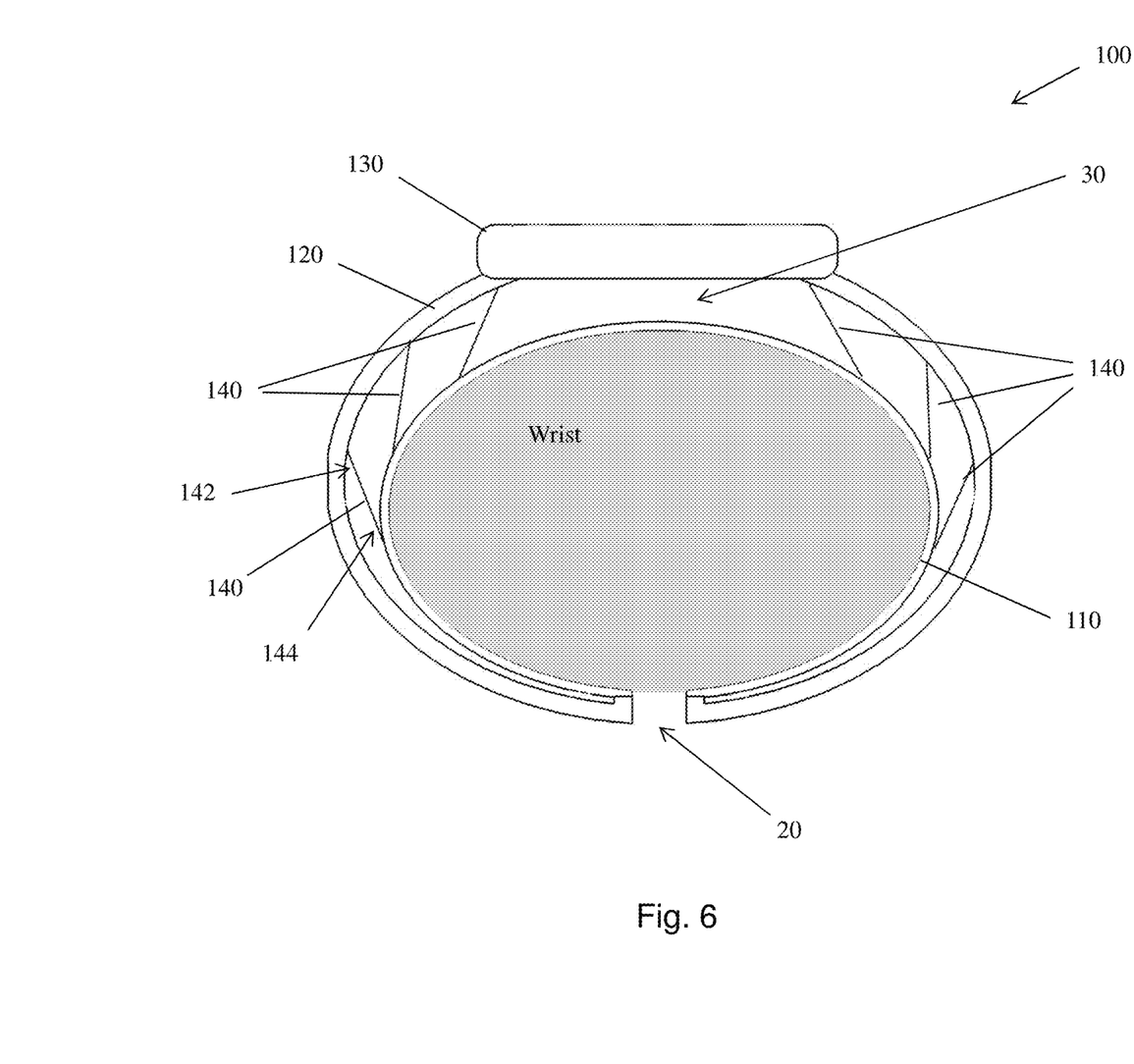
FIG. 6 is a fourth exemplary embodiment of the present invention where piezoelectric patches are constructed between the inner and the outer bands.

FIG. 6 is yet another exemplary embodiment of the present invention. It comprises an inner band 110, an outer band 120, a case body 130, and a plurality of linkages 140 connecting between the inner and outer bands 110, 120 through its two ends 142, 144. The linkages 140 are nanowires each embedded with small piezoelectric composites 150. Different from the above described embodiment where piezoelectric elements are attached on the outer band 120, here in this embodiment the piezoelectric elements 150 are constructed between the inner and the outer bands 110, 120. The piezoelectric composites 150 work like springs and support the outer band 120 and the case body 130. The piezoelectric composites 150 can be unimorph 120a or bimorph 120b as depicted in FIG. 3.

When the outer band 120 moves relative to the inner band 110, the piezoelectric composites 150 will experience loads from the two ends 142, 144, bent or even buckled. Parameters of the piezoelectric composites 150 and the gap 32 between the inner and outer bands 110, 120 need to be carefully designed to achieve high power output and at the same time avoid overstress and fatigue.

The present disclosure also sets forth a method for using the electricity generated by the energy harvester 100. The AC power generated by the energy harvester is transmitted to the power management circuit in the case via cable wires. The power management circuit mainly comprises an AC-DC converter, an impedance matching circuit, an energy storage element (supercapacitor or battery).

Figure 7:
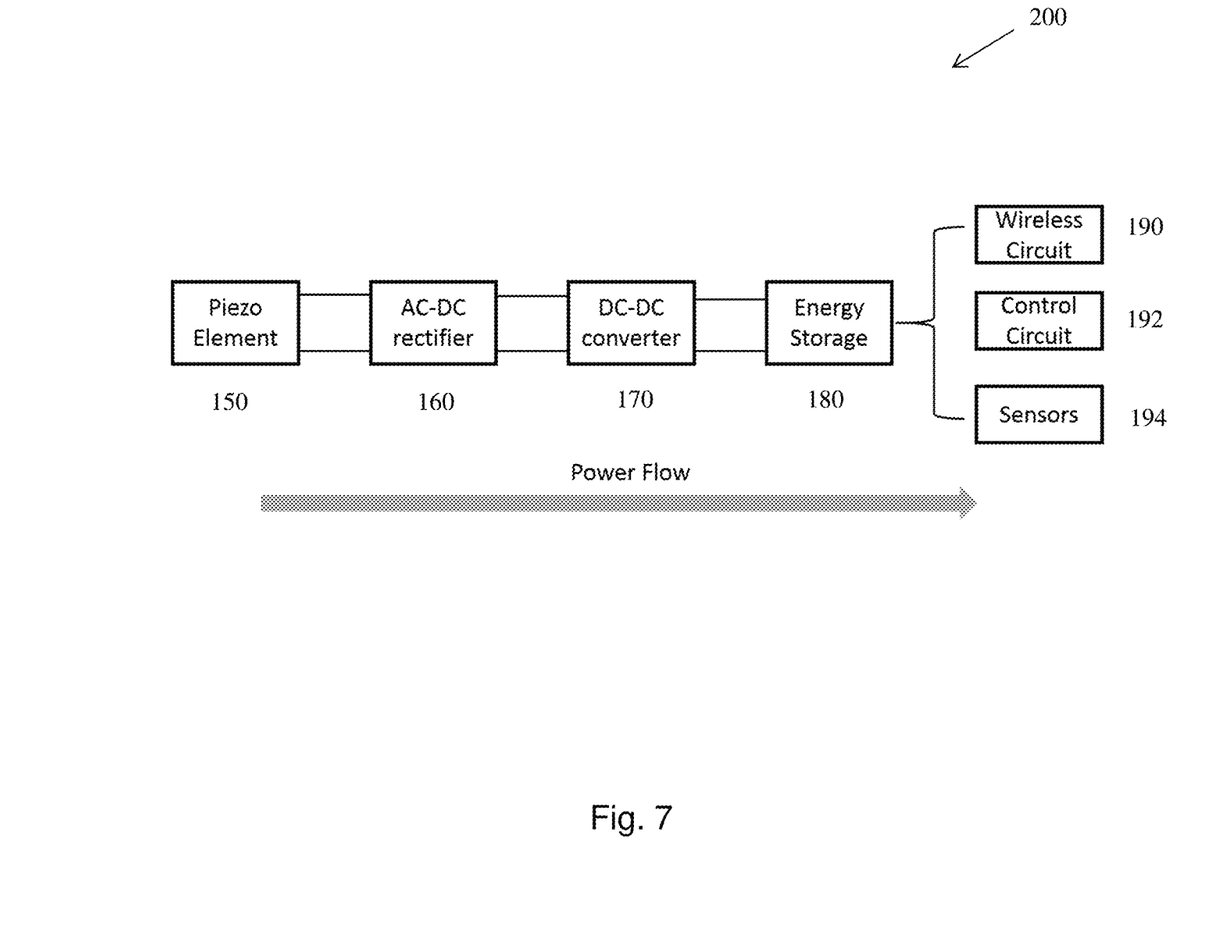
FIG. 7 shows the power management circuit topology of an exemplary embodiment of the present invention.

FIG. 7 shows one exemplary power management circuit topology 200. Piezoelectric elements 150 are electrically connected to rectifier circuits 160 that convert AC current to DC current. Then a DC-DC converter 170 is used to manage the DC output at a proper voltage level for the following energy storage element 180. Rechargeable batteries or supercapacitors can serve as the energy storage element 180, which provide constant power for functional unites of a wearable device 10 such as display screen, wireless communication module 190 (e.g., Bluetooth LE), MCU 192, and sensors 194 (GPS, accelerometer, temperature, light, barometer).

All the circuits, except for some sensors, will be installed in the case body 130. There are two positions for sensors to be installed. One is in the case body 130, the other one is on the inner band 110. It is preferred to integrate all sensors in the case body 130 to reduce fabrication and installation costs.

However, for some special sensors such as the GSR sensor, it had better to be integrated with the inner band 110. Accelerometers may also be integrated with the inner band 110 that is firmly bonded on the wrist to accurately measure body motions. For heartbeat monitoring, we may make a hole on the top of the inner band 110 so that the light sensor can monitor body skins.

Generally, energy may be harvested by one of the two operation modes, namely inertial energy harvesters and direct-excited energy harvesters.

Inertial energy harvesters are such transducers that are fixed on a vibrating base, and move relative to the vibrating base due to the inertial effect. An inertial energy harvester comprises a proof mass to capture more kinetic energy from the inertial effect.

Another type of energy harvesters is named as direct-excited energy harvesters, for which a proof mass is not necessary and they harvest energy from loads directly applied to them.

The present disclosure sets forth a method for harvesting electrical energy by wearing the energy harvester 100. Here the invention has two operation modes and thus belongs to both categories of inertial energy harvesters and direct-excited energy harvesters.

Figure 8:
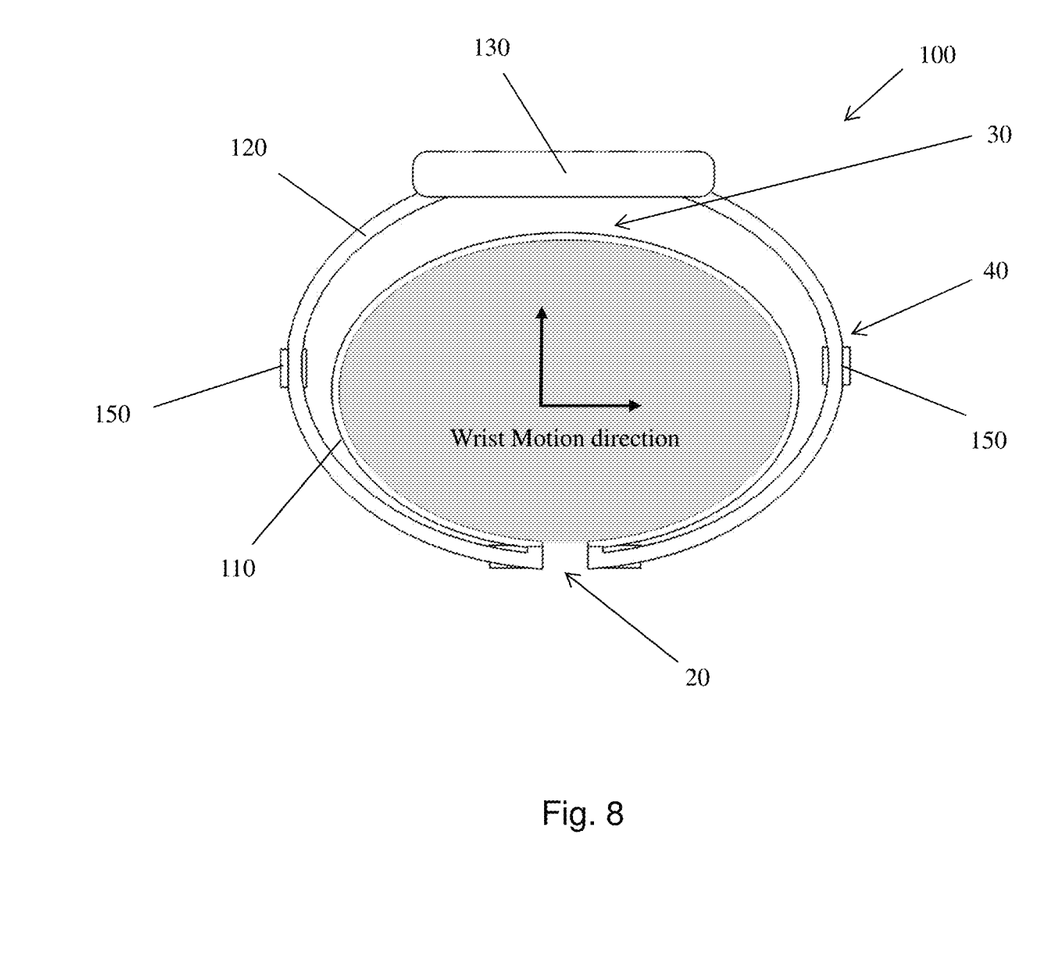
FIG. 8 shows the first excitation mode (wrist vibration mode) of one exemplary embodiment of the present invention.
Figure 9:
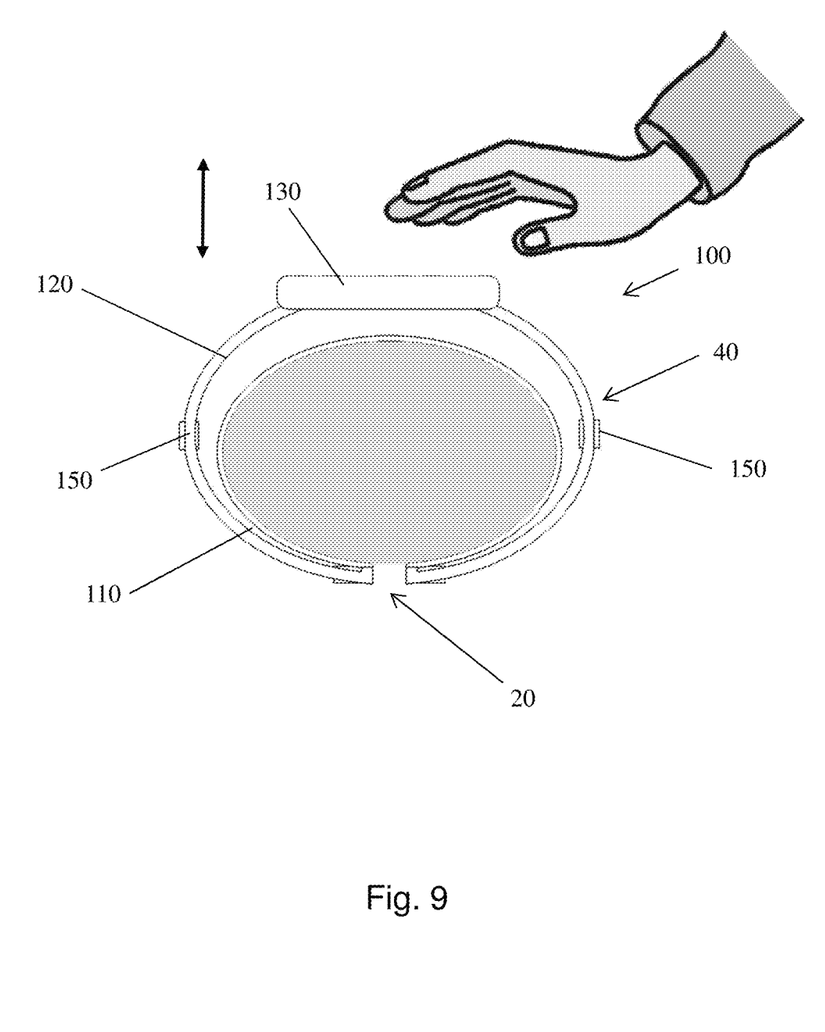
FIG. 9 shows the second excitation mode (hand impact mode) of one exemplary embodiment of the present invention.

FIGS. 8 and 9 show each of the two excitation modes: 1) wrist vibration mode operable to capture the kinetic energy caused by the inertial effect from gravity and the arm motions during human daily activities; and 2) hand impact mode operable to capture the impact energy when a hand strikes the case deliberately. These excitation modes are now described in detail below.

Referring to FIG. 8, wrist motions can be in any directions in/out of the plane of the wrist cross-section. The case body 130 serves as the proof mass and will respond to the base excitations. The movement of the case body 130 relative to the fixed inner band 110 causes strain and stress in the outer band 120. The strain of the outer band 120 is further transmitted to the piezoelectric elements 150 attached on its surface. Via the piezoelectric effect, the varying strain on the piezoelectric elements 150 is converted to alternating current. The current is finally managed and used by the circuits in the case body 130.

The invention takes advantage of the case weight, e.g., watch body. It does not introduce extra weight to the wearable 10. The watch body 130 serves as the inertial mass in the proposed inertial-type vibration energy harvester 100.

For the direct-excited energy harvesting, as shown in FIG. 9, the required strain in the outer band 120 is caused by the hand tapping. This second operation mode is for wearers who do not do activities very often. The hand tapping will directly apply loads on the case body 130 and deform the outer band 120 through the vertical movement of the case body 130. The deformation induces strain on the piezoelectric elements 150 and finally generates electricity via the piezoelectric effect.

Figure 10:
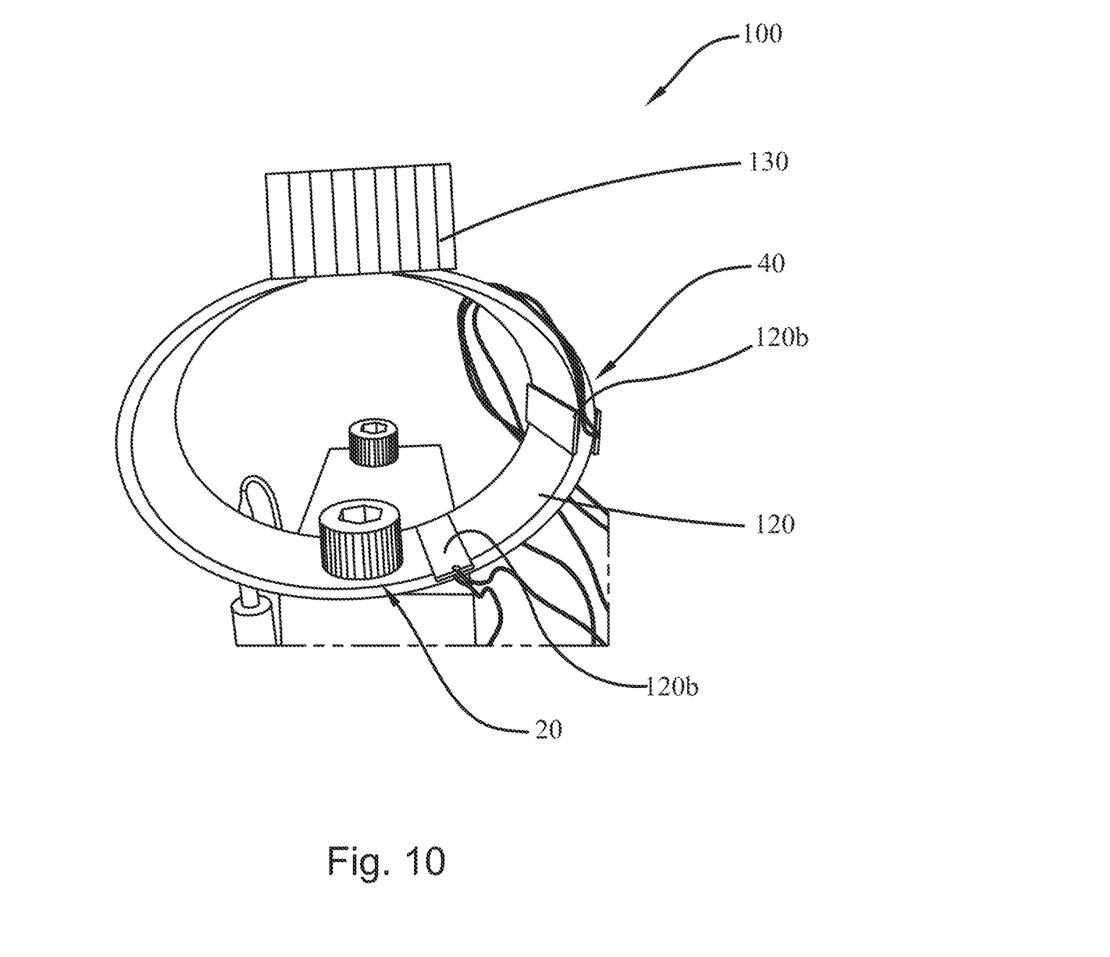
FIG. 10 shows a prototype of one exemplary embodiment of the present invention.

FIG. 10 shows one exemplary embodiment of the present invention. Only the outer band 120 is shown here for simplicity. The outer band 120 may be made of acrylonitrile-butadiene-styrene (ABS) and fabricated by 3D printing technology. The shape of the outer band 120 is an ellipse with semi-major axis, semi-minor axis, uniform thickness and uniform width. The mass at the top of the outer band 120 represents the case body 130. Two bimorphs 120b as described in FIG. 3 are attached to the outer band 120 at the fixed end 20 and the elliptic vertex points 40.

Figure 11:
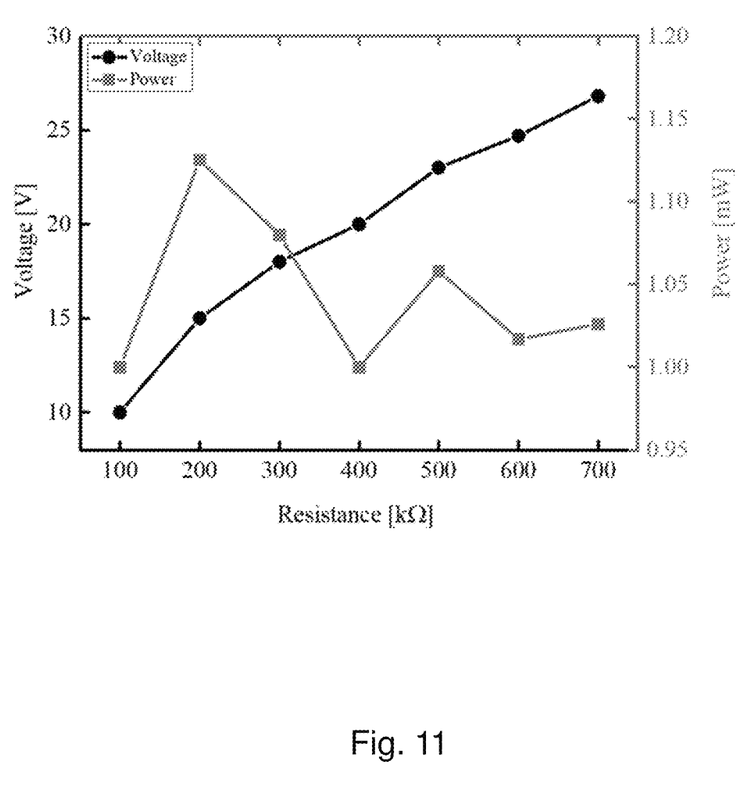
FIG. 11 shows the experimental data of the prototype depicted in FIG. 10.

Excited by the gentle hand tapping, the energy harvester 100 with one piezoelectric element 150 generated a maximum voltage of 25 Volt and maximum power of 1 milliwatts (mW) for one piezoelectric patch 150. Alternatively, if six bimorphs 120b are installed at stress-concentrated spots 40, over 12 milliwatts (mW) power can be generated. Thus, the deposition of multiple piezoelectric elements 150 may multiply the harvested electrical energy per wrist motion.

The present invention takes advantage of the bands of wearables, e.g. watch bands and in particular, the integration of the energy harvesting function bring only very few changes to the structure and/or configuration of commonly-used wrist wearables e.g. watches without taking extra volume for containing the energy harvester 150 and can generate electricity by harvesting kinetic energy associated with human motions e.g. body motions, wrist motions. The endless human body motion is sufficient to provide electricity to wrist wearable continuously without the need of any disposable battery such as a button cell. With such minimal changes, the present invention may be fabricated as a kit and adapted for replacing the strap of any other wearable device in the market.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The foregoing describes some example embodiment (or embodiments) of the present invention and modifications, obvious to those skilled in the art, can be made thereto without departing from the scope of the present invention. While the invention has been described with reference to the example embodiments it should be appreciated that the invention can be embodied in many other forms.

Reference to any prior art in this specification is not, and should not be taken as, an acknowledgement or any form of suggestion that the prior art forms part of the common general knowledge in the field of endeavour in any country in the world.

Although the present disclosure has been described in terms of certain embodiments, other embodiments apparent to those of ordinary skill in the art also are within the scope of this disclosure. Thus, various changes and modifications may be made without departing from the spirit and scope of the disclosure. For instance, various components may be repositioned as desired. Features from any of the described embodiments may be combined with each other and/or an apparatus may comprise one, more, or all of the features of the above described embodiments.

Moreover, not all of the features, aspects and advantages are necessarily required to practice the present disclosure. Accordingly, the scope of the present disclosure is intended to be defined only by the claims that follow.

The various configurations or embodiments described are exemplary configurations only. Any one or more features from any of the configurations may be used in combination with any one or more features from any of the other configurations.

The invention claimed is:

1. An energy harvester comprising:
   an inner band;
   an outer band arranged to surround the inner band, wherein the inner band is coupled to the outer band at a fixed end and the inner band is spaced from the outer band at a free end; and
   an energy generator arranged to generate electric energy through relative movement between the inner band and the outer band at the free end.

2. An energy harvester in accordance with claim 1, wherein the energy generator is positioned on the surface of the outer band.

3. An energy harvester in accordance with claim 2, wherein the energy generator is positioned along the length of the outer band between the fixed end and the free end.

4. An energy harvester in accordance with claim 1, wherein the outer band is elliptic whereby the inner band and the outer band intersecting with each other at the fixed end and separating from each other at the free end.

5. An energy harvester in accordance with claim 4, wherein the energy generator is positioned at a vertex of the ellipse of the outer band.

6. An energy harvester in accordance with claim 1, wherein the outer band is formed by a composite layer.

7. An energy harvester in accordance with claim 6, wherein the composite layer includes an elastic substrate layer and a piezoelectric layer attached thereto, whereby the piezoelectric layer is arranged to generate electric energy in response to deformation of the substrate layer.

8. An energy harvester in accordance with claim 7, wherein the elastic substrate layer is sandwiched between two said piezoelectric layers.

9. An energy harvester in accordance with claim 7, wherein the piezoelectric layer is further covered by a protection layer.

10. An energy harvester in accordance with claim 1, wherein the outer band is of uniform thickness or width across its length along which one or more energy generators are disposed thereon.

11. An energy harvester in accordance with claim 1, wherein the outer band is of variable thickness or width across its length to form one or more spots at which the stress is concentrated and on which the energy generator is disposed, thereby facilitating the generation of electric energy by the energy generator.

12. An energy harvester in accordance with claim 1, further including one or more linkage extending across the inner band and the outer band and the linkage includes said energy generator.

13. An energy harvester in accordance with claim 1, further including an elastic membrane arranged to wrap the inner band and the outer band together to form a composite band.

14. An energy harvester in accordance with claim 13, wherein the elastic membrane is at least one of waterproof and dustproof.

15. An energy harvester in accordance with claim 13, wherein the wrapped inner band and outer band are invisible through the elastic membrane.

16. An energy harvester in accordance with claim 1, wherein the inner band is formed by a first material and the outer band is formed by a second material with a higher stiffness than the first material.

17. An energy harvester in accordance with claim 1, further including a mass at a position proximate to the free end to facilitate the movement of the outer band through its vertical movement, thereby increasing the magnitude of generated electric energy by the outer band.

18. An energy harvester in accordance with claim 17, further including an electronic device arranged to receive electric energy from the energy generator.

19. An energy harvester in accordance with claim 18, wherein the electronic device is received by the mass.

20. An energy harvester in accordance with claim 1, wherein the energy harvester includes at least two said energy generators and the two energy generators are in at least one of serial connection and parallel connection.

21. An energy harvester in accordance with claim 1, further including a rectifier arranged to receive generated electric energy from the energy generator and to convert received electric energy in alternating current to direct current.

22. An energy harvester in accordance with claim 1, wherein the inner band includes a first arm and a second arm connectable together to form a closed loop and releasable from each other to form an open loop.

23. An energy harvester in accordance with claim 1, wherein the inner band is arranged to secure to a human limb for generating electric energy in response to the movement of the outer band activated by the movement of human limb.

24. A wearable device comprising: a wearable strap formed by the inner band and the outer band of the energy harvester in accordance with claim 1, and a mass arranged to receive at least a portion of the wearable device.

* * * * *